(Model.)

J. K. VOORHEES.
SEED DROPPER AND MARKER.

No. 244,694. Patented July 19, 1881.

WITNESSES

INVENTOR
John K. Voorhees
by Anderson & Smith
ATTORNEYS

UNITED STATES PATENT OFFICE.

JOHN K. VOORHEES, OF PELLA, IOWA.

SEED DROPPER AND MARKER.

SPECIFICATION forming part of Letters Patent No. 244,694, dated July 19, 1881.

Application filed November 20, 1880. (Model.)

*To all whom it may concern:*

Be it known that I, JOHN K. VOORHEES, of Pella, in the county of Marion and State of Iowa, have invented a new and valuable Improvement in Seed Droppers and Markers; and I do hereby declare that the following is a full, clear, and exact description of the construction and operation of the same, reference being had to the annexed drawings, making a part of this specification, and to the letters and figures of reference marked thereon.

Figure 1:
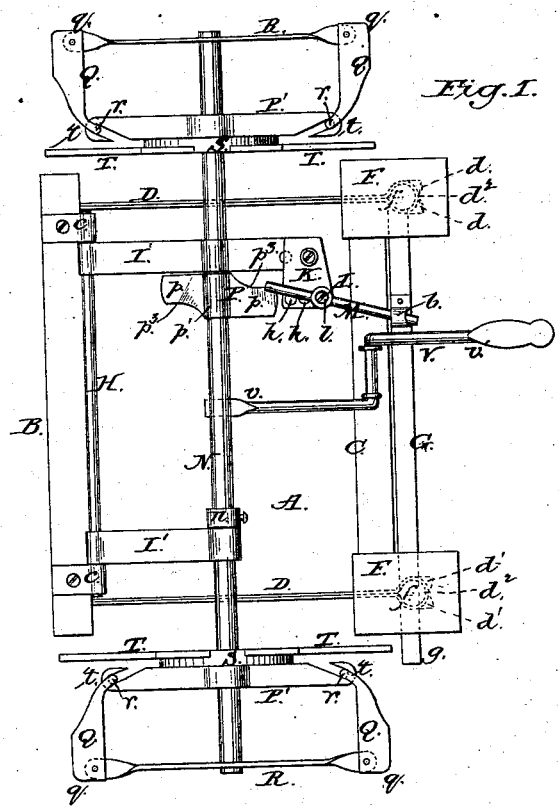
Figure 2:
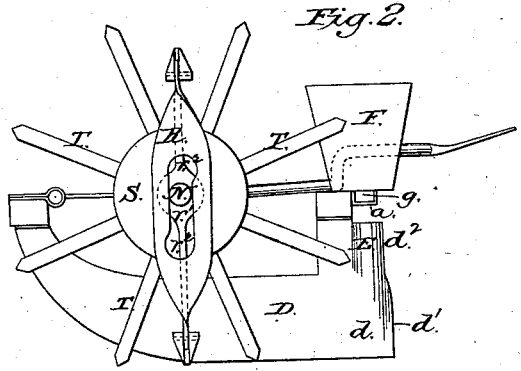
Figure 3:
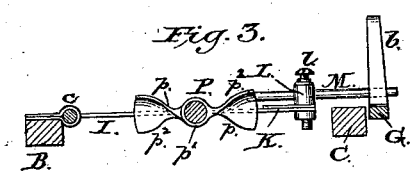

Figure 1 of the drawings is a plan view. Fig. 2 is a side view. Fig. 3 is a sectional detail.

This invention relates to seed droppers and markers.

The invention consists in the construction hereinafter described and claimed.

In the annexed drawings, A represents the dropper-frame consisting of front bar, B, and rear bar, C, connected together at their ends by shoes D, curved upward in front, and having their rear ends diverging at $d\ d$, open at $d'$ and closed at $d^2$, forming a tube, E.

Seated upon the ends of rear cross-bars, C, with their openings $f$ immediately over tubes E, are seed-hoppers F. Lengthwise of bar C, to the rear thereof, is a bar, G, whose ends $g$ pass through loops $a$ at bottom of hoppers F, and are supported therein, said ends $g$ being adapted to close openings $f$. Upon the top of bar G is an elongated loop, $b$, extending upward from said bar.

Secured to the rear side of front bar, B, in loops $c$, is a rod, H, having motion in the said loops, and extending backward from said rod are arms I I', said arms I I', rod H, and loops $c\ c$ forming a hinge. Upon the outer end of arm I is secured a bracket, K, extending inward from said arm I. Fastened to the outer edge of said bracket, and adjustable in a series of holes, $h$, is a post, L, through which runs a finger-rod, M, held in said post by a set-screw, $l$. This finger-rod M extends backwardly and projects through the loop $b$.

Passing through bearings at end of arm I' and upon arm I, between rod H and bracket K, is a shaft, N. Secured upon this shaft N, to the inside of arm I, is a tappet-cam, P, whose arms $p\ p$ project in opposite directions, and whose body or sleeve $p'$ surrounds the shaft N.

These arms $p\ p$ have cam ends $p^2\ p^2$, and are arranged out of line—that is, their edges $p^3\ p^3$ are inside of each other. The location of this tappet upon shaft N is such that as said shaft turns the cam ends alternately come in contact with the inner end of finger-rod M. As the cam-surfaces are arranged in oppositive directions, like a propeller-screw, they throw said finger-rod alternately in oppositive directions, and thus open and close the openings $f$ of hoppers F. Upon shaft N, and held thereto by a set-screw inside of arm I', is a collar, $n$.

Secured to shaft N, near its ends, outside of shoes D, are the marker-bars P', having their ends hooked at $t$. By eyes $r$ the markers Q are hung upon hooks $t$. Attached loosely to the ends $q$ of markers Q is a bar, R, extending from one marker to the other. In the body of said bar R is a slot, $r'$, having its ends enlarged upon opposite sides at $r^2\ r^2$. This slot fits over the end of shaft N.

Upon shaft N, inside of marker-bar P', are located hubs S, having projecting from their peripheries the spikes T, made adjustable by holes and bolts.

Journaled upon cross-bar C is a lever, V, whose front end, $v$, is under shaft N, and its rear end, $v'$, extends backward.

This device can be used separately, or is fastened by its front bar, B, to an ordinary planter. As it travels forward the shoes D prepare the ground for the seed, the cam-tappet opens openings $f$ in the seed-hoppers, and the markers Q lay off the rows.

By means of the elongated loop $b$ the shaft N may move up and down by means of the lever V, or by irregularities in the ground, without affecting the operation of the bar G, the outer end of rod M riding up and down in said loop $b$.

By making the ends of slots $r'$ enlarged at $r^2$ the markers are kept from falling until they reach the perpendicular.

By making the fulcrum of the finger-rod adjustable the throw of the same can be regulated and the seed dropped faster or slower.

What I claim is—

In a combined seed dropper and marker, the combination, with the shaft N, mounted on steer-wheels, of the marker-bar P', having hooks $t\ t$, the hinged markers Q Q, and the bar R, provided with the slot $r$, having circular enlargements at the ends upon opposite sides of slot $r$, connecting the markers Q, constructed and operating substantially as and for the purposes set forth.

In testimony that I claim the above I have hereunto subscribed my name in the presence of two witnesses.

JOHN K. VOORHEES.

Witnesses:
 IRA M. EARLE,
 P. H. BOUSQUET.